United States Patent [19]

Krämer et al.

[11] Patent Number: 5,724,863
[45] Date of Patent: Mar. 10, 1998

[54] CONNECTING ROD

[75] Inventors: Michael Krämer, Notzingen; Karlwalter Schmidt, Lindau, both of Germany

[73] Assignee: Daimler Benz AG, Stuttgart, Germany

[21] Appl. No.: 698,093

[22] Filed: Aug. 15, 1996

[30] Foreign Application Priority Data

Aug. 17, 1995 [DE] Germany .................. 195 30 191.9

[51] Int. Cl.[6] ..................................................... G05G 1/00
[52] U.S. Cl. .................. 74/583; 74/579 R; 74/579 E; 123/48 R; 123/78 BA; 123/78 B
[58] Field of Search ...................... 74/579 R–579 E, 74/583–586; 123/197.3, 78 BA, 48 R, 78 B

[56] References Cited

U.S. PATENT DOCUMENTS

| 1,610,137 | 12/1926 | Kratch . | |
|---|---|---|---|
| 2,104,802 | 1/1938 | Hansen | 123/197.3 |
| 2,134,995 | 11/1938 | Anderson | 123/197.3 |
| 2,252,153 | 8/1941 | Anthony | 123/197.3 |
| 2,523,631 | 9/1950 | Paxton et al. . | |
| 2,580,825 | 1/1952 | Orloff . | |
| 4,111,164 | 9/1978 | Wuerfel | 123/197.3 |
| 4,140,091 | 2/1979 | Showers | 123/197.3 |
| 4,370,901 | 2/1983 | Bolen | 74/586 |
| 4,463,725 | 8/1984 | Laufer et al. | 123/446 |
| 4,703,838 | 11/1987 | Roussin et al. . | |
| 4,966,109 | 10/1990 | Pusic et al. | 74/579 E X |

FOREIGN PATENT DOCUMENTS

| 28 53 589 | 6/1978 | Germany . |
| 27 34 447 | 2/1979 | Germany . |
| 33 39 360 | 5/1985 | Germany . |
| 37 35 415 | 5/1989 | Germany . |
| 38 04 859 A1 | 8/1989 | Germany . |
| 252 208 | 9/1948 | Switzerland . |
| 912962 | 3/1982 | U.S.S.R. . |

*Primary Examiner*—Vinh T. Luong
*Attorney, Agent, or Firm*—Klaus J. Bach

[57] ABSTRACT

In a connecting rod of a piston machine which comprises two separate parts which are longitudinally movable relative to one another but operatively interconnected and of which one part is connected to the piston and the other is rotatably mounted on the crank of a crankshaft, the two connecting rod parts are interconnected by a fluid spring structure in which a fluid is utilized as a spring element for operatively interconnecting the connecting rod parts.

14 Claims, 5 Drawing Sheets

CONNECTING ROD

BACKGROUND OF THE INVENTION

The invention relates to a connecting rod for the transfer of energy between a piston and a crankshaft of a piston machine wherein the connecting rod comprises two parts which are longitudinally movable relative to one another and operatively interconnected by an energy storage structure.

During the operation of piston engines, high pressures develop in the engine combustion chambers. In gasoline engines and in Diesel engines high pressure spikes are generated during combustion and are effective on the piston when the piston is in the upper dead center position. In this manner, a pressure peak is generated whose energy cannot be utilized because of the inertia of the crank assembly.

DE OS 33 39 360 shows a two-part connecting rod for a piston engine wherein the connecting rod parts are telescopically movable into one another and a spring is disposed between the two connecting rod parts which is effective for compression and tension force transmission. During the power stroke, the spring stores some of the energy and returns it at a later point.

However, it has been found that the kinematic forces of the freely movable part of the connecting rod are subjected to such high inertia forces that the spring, by oscillation about the spring neutral position between maximum pressure load and maximum tension load is subject to rapid fatigue of the spring material.

Especially during engine load changes, the pressure peaks vary greatly which results in rapid spring breakage or at least an undesirable lengthening of the mechanically and thermally highly loaded spring so that the piston may hit the inlet and outlet valves extending into the combustion chamber of the piston engine when the valves are fully opened.

Furthermore, it has been found that, with such a two part connecting rod as described in DE OS 3 339 360, the piston pin is subjected to high impact load when the crank reaches bottom dead position. The reason herefor is that the deceleration of the piston is not uniform when the piston moves toward its bottom dead center position as this is the case with conventional rigid connecting rods, but that the piston deceleration ends only after the crank has passed the bottom dead center position and has already been accelerated in the upward direction. The two kinematic movements oft he downwardly moving piston on one side and the rapidly accelerating upward movement of the crank are particularly disadvantageous for all components participating in the rotation of the crankshaft. Because of the geometric correlation of piston and crankshaft crank, the inertia forces of the reciprocating masses acting on the crank vary and the pattern of motion is not symmetrical. The energy of the pressure peaks stored in the spring can therefore not be utilized properly. If the pressure peak collapses, the spring stretches again over its neutral position and energy is transferred to the piston. Such non-symmetrical patterns in the travel/time relationship of the crank drive detrimentally affect the quality of the combustion process and generate greatly varying bearing loads which result in early wear.

Furthermore, piston engines cover generally a speed range of several 1000 rpm. In this connection, the characteristic frequency of the spring has to be carefully considered. This may greatly limit the range of operation in which the flame-front of the combustion is not disturbed by vibrations returning to, and acting on, the piston. Because of the undesirable kinetic behavior described before frequent service is necessary to insure safe operation. Since low emissions, long life, smooth operation, a large speed range and long service intervals are expected of modern piston engines, such a connecting rod has not been used in practice.

To avoid the problems described above, DE OS 38 04 859 discloses a spring-type connecting rod which consists of a steel tube which is spirally cut to form a spiral winding with a piston pin bearing structure welded to its end. At the opposite end, the spring type rod has a two part bearing housing structure. The compression space on top of the cylinder is omitted since the compression pressure is intended to compress the spring so that sufficient compression space is then provided above the piston. In order to minimize the volume remaining when the piston is in its upper dead center position the exhaust valve is an annular valve. This is said to improve the combustion and to eliminate the tendency to knock which is caused by the unsymmetric dynamic behavior described earlier.

In accordance with DE OS 38 04 859, the diameter of the spring should be as large as possible. This permits the spring to be relatively stiff whereby the unsynmmetry in the travel/time behavior is reduced but, on the other hand, this also leads to undesirably large oscillating masses. Furthermore, the use of such a spring-type connecting rod requires a complete redesign of the engine compression space and of the cylinder head which is to be provided with an annular valve. Furthermore, such an annular valve is subjected to extremely high thermal loads which can hardly be managed as it has a large area disposed in the exhaust gas flow. An effective sealing of the compression space becomes difficult since the combustion pressure load on the annular valve is not taken up by a normal valve seat, but by the operating mechanism of the valves. Since, generally, there is some mechanical play, effective sealing and cooling can be achieved only with great design expenses which increase the engine, and consequently, the vehicle weight. Furthermore, the crank is heavily strained by the large oscillating masses. Such strain leads to high surface pressures which reduce the mechanical efficiency, the reliability and the life especially of the crankshaft crank. In addition, the spring may vibrate at its critical frequency which could result in spring breakage or in a breakdown of the crankshaft or breakage of the spring and which may result in a nonuniform flame travel that might result in knocking or incomplete combustion.

Gasoline engines generally have controlled exhaust gas catalytic converters whose conversion capability is better the better already the combustion is. Although the known spring type connecting rods provide for an automatic adaptation of the compression ratio with a smaller compression ratio at full load and a greater compression ratio during partial load, the problems of the crankshaft drive as described earlier for load-dependent different filling degrees disadvantageously affects the ignition timing of gasoline engines or the injection timing of Diesel engines to such a degree that the required high combustion effectiveness can be achieved only in a relatively small engine speed range. Beyond the small engine speed range the combustion quality deteriorates rapidly.

The use of the known spring-type connecting rods in gasoline, or Diesel engines is therefore very difficult. The major problem however is that the hard hitting of the spring when reaching full length detrimentally affects the flame front travel in the combustion chamber of an adjacent cylinder in engines with several cylinders. The results are incomplete combustion, knocking tendencies, high mechanical load of the crankshaft components and high noise emission.

With the connecting rods known so far the utilization of the pressure spike forces occurring during the combustion in a piston internal combustion engine and during the compression stroke of piston compressors or pumps has not been possible.

It is the object of the present invention to provide a connecting rod by which the energy of pressure spikes can be transferred to the crankshaft as completely as possible without disadvantageously affecting the kinematics of he crankshaft and the engine performance and to improve the engine emission characteristics as far as gasoline and Diesel engines are concerned.

SUMMARY OF THE INVENTION

In a connecting rod of a piston machine which comprises two separate parts which are longitudinally movable relative to one another but operatively interconnected and of which one part is connected to the piston and the other is rotatably mounted on the crank of a crankshaft, the two connecting rod parts are interconnected by a fluid spring structure in which a fluid is utilized as a spring element for operatively interconnecting the connecting rod parts.

The connecting rod can be used for a one- or a multi-cylinder piston machine and can be installed without requiring extensive conversion of the machine so that a normal engine or pump can be easily converted.

The connecting rod according to the invention utilizes the relatively small elasticity of a fluid to provide a fluid spring. When cold the fluid spring is very stiff which favors the engine starting capability since, in accordance with experience, for starting the engine, the compression should be greater than the optimal compression, especially for Diesel engines. When, with increasing operating temperature, the elasticity of the fluid in the fluid spring increases, the fluid spring becomes softer. At 100° C., for example, a common motor oil experiences a volume compression of about 1% if it is subjected to a pressure of 100 bar. Under vacuum, the volume increases at a correspondingly small rate. This elasticity of the motor oil results in a small geometric shortening of the connecting rod which does not detrimentally affect the kinematics of the crank drive, but which is sufficient to vary the engine compression ratio depending on engine load such that, during combustion, the flame front travels in an optimal way and a uniform combustion is achieved at any engine load. The fluid spring is so stiff that no disadvantageous oscillations between the piston and the crank can occur.

During the expansion stroke, the fluid spring instantly absorbs energy generated by pressure spikes and returns the energy to the crankshaft in a time delayed manner as soon as the pressure decreases that is clearly within the expansion stroke. The kinematics is optimized in this manner and the bearing load is reduced. Because of the relatively high degree of uniformity the life expectancy of the bearings and all the other moving parts is substantially increased and the conditions for a uniformly progressing flame front are improved so that also the emission of noxious substances is reduced. In this manner, the energy contained in the pressure peaks becomes usable. Since the compression and the subsequent expansion stroke occur in a very short period of time the fluid in the fluid spring does not normally assume excessive temperatures. However, with larger volumes the fluid friction causes the fluid in the fluid spring to be heated. This is prevented in a preferred embodiment of the invention wherein, in piston machines which include a pressurized oil lubrication system, one or each stage of the fluid spring and delay structure of the fluid spring are integrated into the oil lubrication system of the piston machine so that the oil contained in the fluid spring is circulated.

In order to convert the axial movement of the piston into rotational movement of the crankshaft the connecting rod has at one end a bearing structure by which the piston is pivotally connected to the connecting rod. The pivot connection is generally provided by a piston pin which extends through bearing bores formed in the piston and in the connecting rod. However, it is also possible to provide for the pivotal connection between the piston and the connecting rod by a balljoint-like arrangement. In this case, the joint structure at the upper end of the connecting rod has the shape of a ball which is received in a corresponding special opening in the piston. For constructional reasons, it is preferred if the ball structure is at the end of the connecting rod where it can have a sufficiently large bearing surface area.

A particularly compact single stage connecting rod which can be economically manufactured is obtained if the connecting rod part adjacent the crank shaft is a hollow tube-like structure and the upper connecting rod part attached to the machine piston forms a compression piston which is received in the tube like connecting rod structure so that a pumping space is formed within the connecting rod within which the piston of the upper connecting rod part is received in fluid tight relationship. The piston is engaged by a compression spring which biases the piston against a stop at the end of the connecting rod part which is attached to the crankshaft. At its opposite end, the compression spring is supported by a support head mounted on a rod extending axially from the crankshaft end of the connecting rod. The fluid spring is formed by the hollow space within the tube-like connecting rod part which is in communication with the pressurized oil system of the piston machine by way of an oil passage in the crankshaft, an oil bore in the connecting rod bearing structure at the crankshaft end thereof and an oil bore in the piston structure. In order to prevent reactions affecting the oil circulating system the pressurized oil line or, preferably, the oil bore in the base plate of the connecting rod is provided with a check valve.

The delay structure of the fluid spring is formed by a disc which is slidably supported in the tube-like connecting rod part adjacent the crankshaft and which forms an overflow gap. An anchoring rod extends through the disc and includes an anchoring head with a seal face cooperating with a seal surface on the disc. The disc is biased into engagement with the seal face of the anchoring head by a compression spring which is axially adjustably supported by the anchoring rod. When the fluid spring is compressed the central opening of the disc is partially freed. This increases the flow cross-section so that, within a short period of time a large partial fluid volume can pass from the pump space into the hollow space of the tube-like connecting rod. When the compression pressures in the fluid spaces are equalized, the central opening is again closed by the cooperating seal surfaces. The oil under pressure can then return from the hollow space to the pump space only through the flow gap formed between the tube-like connecting rod and the discs. However, an additional flow passage may be provided in the disc by which the pumping pace is in communication with the hollow space. The cross-section of the flow gap between the tube-like connecting rod and the disc and of the flow passage in the disc determine the time within which the energy stored in the fluid spring is returned, without great losses, to the crankshaft whereby also an instant reaction of the fluid spring, after being compressed, is prevented.

In a particularly advantageous embodiment the connecting rod includes a two-stage fluid spring wherein an internal tube is arranged in the hollow space of the tube which separates a first space from a second space, the first space being in communication with the pump space by way of a passage of constant cross-section and the second space being in communication with the pump space via passages with valve means providing for a variable cross-section. Such an arrangement may be used in connection with piston machines in which the pressure increase requires initially a first spring characteristic and then a second spring characteristic because of certain operating conditions. The spring characteristic may be—relative to one another—first steep and then flat or first flat and then steep depending on the selection of the volume ratio of the fluid spaces.

In order to be able to increase the length of the connecting rod so as to improve the spring characteristics by more voluminous fluid spaces, it is advantageous to extend the crank end part of the connecting rod up to an area within the piston pivot bearing structure. The pump space can be extended up to a point adjacent the inner surface of the piston bottom wall whereby the captured oil volume is substantially increased. The pressure piston is defined by the outer surface of the hollow tube which arrangement provides for a relatively large piston pump diameter providing for an increased piston pressure surface area. In this manner, the forces are transmitted by the piston directly to the oil and the forces to which the piston pin bearing is supported are relatively low.

All the components exposed to the oil pressure can therefore be thinner and lighter which reduces the manufacturing costs for the components and the connecting rod. The piston pivot support bearing structure does not transmit any forces to the tubular rod part since the piston forces are transferred from the piston bottom directly to the oil in the pump space. The piston pivot bearing has only guiding and sealing functions.

If, as a result of this design, the oil leakage is relatively high, the connecting rod, that is the hollow space therein, could be in communication with a crank bearing pocket by way of an oil passage in the piston rod crank bearing structure and the pumping space is in communication, by way of an oil bore, with a piston pin bearing pocket and the crankshaft includes a pressurized oil passage through which oil under pressure is supplied to the crank bearing pocket. In order to prevent a return oil flow from the hollow space, a check valve is provided in the pressurized oil supply line. Preferably, the check valve is arranged in the base plate of the hollow tube. The piston pin bearing pocket and the crank bearing pocket consist of narrow grooves which extend circumferentially over an arc with a 130° angle so that the surface area of the bearing pockets is smaller than the cross-sectional area of the pressure piston. With this simple arrangement, the hollow space in the tube is in a surprisingly simple manner automatically fluidically sealed when the fluid is subjected to sudden high pressures so that the spring capability of the fluid can be fully utilized.

For piston machines with an especially long stroke, it is advantageous if the connecting rod part associated with the crankshaft rod is substantially longer than the connecting rod part associated with the piston since this increases the stability of the connecting rod according to the invention.

The invention provides for a connecting rod which is capable of transmitting the energy of pressure spikes to the crankshaft by which the kinematics of the crank drive is not affected detrimentally. The geometric correlations remain undisturbed to such a degree that, as far as kinematics is concerned, the connecting rod according to the invention acts like a fully rigid connecting rod but it is nevertheless capable of transferring the energy of pressure spikes smoothly to the crankshaft. This energy utilization and the much more uniform loading increases the engine efficiency, the engine life and the engine smoothness substantially. In addition,the compression ratio automatically adjusts to the engine operating conditions. With an appropriate selection of the geometric, the temperature and the load-dependent changes of the length of the connecting rod according to the invention, the compression can be adapted in a simple manner for optimum fuel utilization and low emission combustion. By the balanced kinematic behavior of the crank drive even the service intervals may be extended. Also, with a connecting rod with fluid spring, the characteristic frequency of the system is so high that under-critical operation is always present. The connecting rod according to the invention is consequently universally usable for piston machines as it transfers pressure peaks to the crank drive in a time delayed manner and provides a basis for a further reduction of emissions of gasoline and Diesel engines.

The invention will be described below on the basis of the accompanying drawings.

DESCRIPTION OF THE PREFERRED EMBODIMENTS

Figure 1:
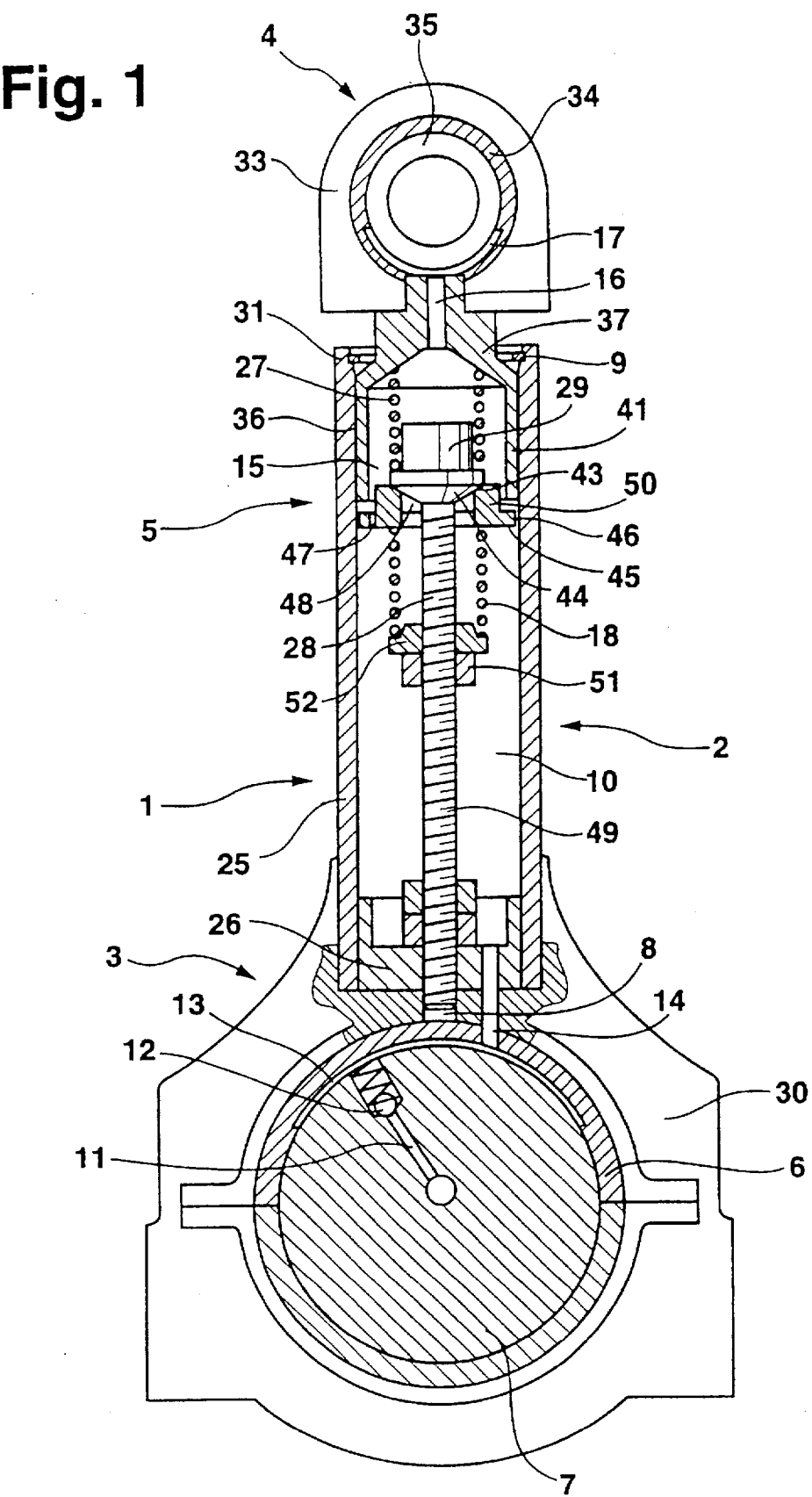
FIG. 1 is a partially sectional view of a connecting rod according to the invention with a single-stage fluid energy storage arrangement and an energy return delay member.

FIG.1 shows a two-part connecting rod 1 which includes a single-stage energy storage in the form of a fluid spring 2. The connecting rod 1 includes a first connecting rod part 3 associated with a crank of a crankshaft and a second connecting rod part 4 which is mounted to a piston of a piston machine by a piston pin. The fluid spring 2 is provided with a delay structure 5 disposed within the connecting rod part 3 and activated fluidically in a rod pulling direction. The connecting rod part 3 includes at one end a bearing structure 30 which may be a two-part structure and which supports a crank bearing 6 receiving a crank 7 of a crankshaft which is not shown in the drawing. The connecting rod 3 consists of an elongated tubular body 25, which forms within a space 10 of circular cross-section and which is substantially longer than the other connecting rod part 4. At its end adjacent the crank 7, the connecting rod part 3 is closed by a base 26 and the other end of the connecting rod part 3 defines a connecting rod neck 31. The connecting rod base 31 is provided with an oil bore 14 leading to a crank bearing pocket 13 of the crank bearing 6. The crank bearing pocket 13 is a narrow circumferentially extending groove formed in the crank bearing 6 adjacent the crank. The groove is formed in the axial center of the crank bearing 6.

The connecting rod part 4 is in the form of a compression piston 4, which has at one end a piston pin bearing structure 33 with a piston pin bearing 34 in which a piston pin 35 is mounted for pivotally supporting a piston of the piston machine. At its other end, the compression piston 41 has a slide fit structure 36 which extends into a piston neck 37 toward the piston pin bearing structure 33. Within the compression piston 41, there is a pumping space 15 from which an oil passage 16 extends to a piston pin bearing pocket 17 of the piston pin bearing 34. The piston pin bearing pocket 17 is a narrow groove formed adjacent the pin and extending radially into, and circumferentially, over a segment of the piston pin bearing. The groove is formed in the axial center of the piston pin bearing 34.

The bearing pockets 13 and 17 are so dimensioned that their surface areas are smaller than the fluidically effective cross-sectional area of the compression piston 41. Furthermore, the segment is, in each case, smaller than 170° —arranged symmetrically to the longitudinal axis of the connecting rod—so that a load-dependent self-sealing effect of the fluid spring by the piston pin and the crank is obtained when the connecting rod is compressed. In the example given in FIG. 1, the angle over which the segments extend is about 130°.

In the connecting rod neck 31 of the connecting rod part 3 remote from the bearing support structure 30, the connecting rod part 4 is axially movably supported by means of a slide fit structure 36. At the end of the connecting rod neck 31, there is a stop 9 in the form of a spring clip which is received in a circular groove and which is engaged by the neck 37 of the compression piston 41 when the compression piston 41 is in its end position, in which the connecting rod has its maximum length. A threaded bore 8 is formed in the base 26 centrally within the hollow space 10 and a rod 28 having a thread 49 is screwed into the threaded bore 8 so as to be axially position-adjustable and lockable by locknuts. The rod 28 extends into the pump space 15a and is provided with a head 29. In the pump space 15, the head 29 of the rod 28 is engaged by a compression spring 27 which biases the compression piston 41 toward its end position in engagement with the stop 9.

During start-up of the piston machine, the hollow space 10 of the fluid spring 2 is filled with oil from the oil circulation system (not shown) of the piston machine by way of a pressurized oil supply passage 11 extending radially from the crank 7 and provided with a check valve 12 to prevent oil return flow. During operation, any oil leakage from the piston pin bearing 34, the crank bearing 6 and the slide fit structure 36 is replenished through the oil supply passage 11.

The oil supply passage 11 is arranged in the crank 7 such that, during rotation of the crank, it reaches the crank bearing pocket 13 when the fluid spring is not compressed.

The rod 28 has, at its side facing the hollow space 10, a sealing surface 44, which cooperates with an adjacent sealing surface 43 of a disc 50. The disc 50 has a central opening 48 through which the rod 28 extends. The disc 50 is biased with its sealing surface 43 into sealing engagement with the sealing surface 44 of the head 29 of the rod 28 by a compression spring 18 which is supported by a spring seat 52 which is axially adjustably supported on the rod 28 and can be locked in position by a locknut 51 for setting the tension of the spring 18. Between the disc 50 and the interior wall of the tubular body 25, there is provided a narrow circumferential leakage flow gap 46 forming a flow restricting means. In addition, or alternatively, a leakage flow passage 47 may be provided for communication between the pump space 15 and the hollow space 10 if this is required to provide certain spring characteristics.

When the connecting rod t is compressed by the compression piston 41, the same high pressure is rapidly established in the pump space 15 and in the hollow space 10, as a partial volume corresponding to the energy content of the pressure peaks flows past the rod head 29 into the hollow space 10.

The disc 50 divides the fluid spring into two sections 10 and 15 of different volumes both filled with oil. When the pressure on the connecting rod 1 eases first also the pressure in the pump space 15 becomes smaller whereupon the oil returns from the hollow space 10 to the pump space 15 through the flow gap 46 at the circumference of the disc 50 in a time delayed fashion as this flow is throttled.

The delay characteristics are predetermined by appropriate dimensioning of the volume of the spaces providing for the spring action taking into consideration the physical properties of the oil. The effective flow cross-section of the flow gap and, respectively, the flow passage 47 are so dimensioned that the oil pumped during the compression of the connecting rod 1 from the pump space 15 into the hollow space 10 can return into the pump space 15 before the connecting rod is re-compressed, that is within a period depending on the rotational speed of the piston machine, without being subjected to excessive pressure losses. A more rapid return flow is prevented however, whereby harmonic oscillations in the volume mass-oil spring system are prevented.

Figure 2:
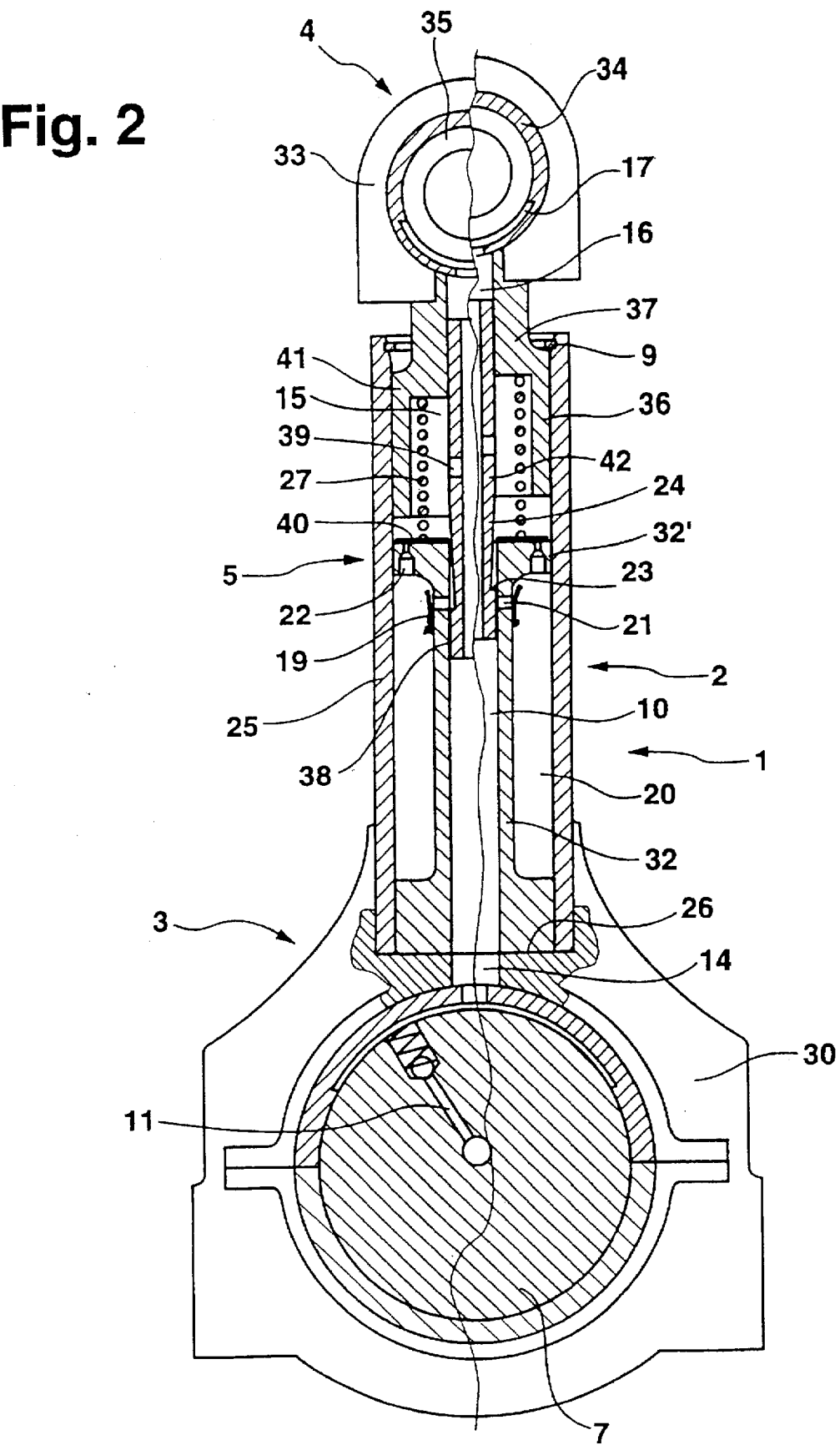
FIG. 2 is a partially sectional view of a connecting rod with a two-stage fluid energy storage arrangement and damping members showing on the right the activation of the first stage and on the left, the activation of the second stage.

FIG. 2 shows a connecting rod 1 with a two-stage fluid spring 2 which is again formed by a first connecting rod part 3 associated with the crank and a connecting rod part 4 associated with the piston of the piston machine.

Since the connecting rod parts 3 and 4 are essentially the same as those already described in connection with FIG. 1 the same reference numerals are used for the designation of corresponding parts.

In the embodiment of FIG. 2, there is provided in the hollow space 10, instead of the rod, an inner tube 32 which is firmly mounted onto the base 26 of the tubular body 25 and which forms a second hollow space 20 within the first hollow space 10. At its upper end, the inner tube 32 has a radial collar 32', which sealingly engages the inner wall of the tubular body 25 and which separates the pump space 15 from the second hollow space 20. With the concentric pressure spaces in the connecting rod, a uniform pressure distribution in the tubular body 25 is achieved so that, with relatively long connecting rods, the tubular body is not unsymmetrically deformed by the fluid pressure. The pump space 15 is in fluid flow communication with the second hollow space 20 by way of openings 21 formed in the inner tube 32.

The compression piston 41 is biased by a compression spring 27 toward a stop disposed in the area of the connecting rod neck 31 of the connecting rod part 3 associated with the crank 7. Furthermore, the pressure piston 41 includes an axially adjustable slide member 42 which extends through the pump space 15 and which separates the hollow space 10 from the pump space 15. The pump space 15 is in fluid communication with the first hollow space 10 by way of openings 39 in the slide member 42. At its lower end, the slide member 42 has a slide valve structure 38 which covers the opening 21. Adjacent the slide valve structure 38, the slide member 42 has a control edge 24 which, upon axial movement of the pressure piston 41 and the slide member 42 movable therewith, exposes the openings 21 so that the second hollow space 20 is then also in fluid communication with the pump space 15.

By way of the oil bore 14 leading to the crank bearing 6, oil is supplied from the oil supply passage 11 of the pressurized oil supply system to the hollow space 10 and, via the oil passage 16 to the piston pin bearing 34.

The characteristic spring curve of the first stage is determined by the hydraulically effective surface area of the compression piston 41 in relation to the volume of the pump space 15 and the hollow space 10 and, if a two stage spring is used, also the second hollow space 20 of the second stage which is in communication with the pump space 15 by way of the passages 22.

The cross-sections of the openings 21 are selected to be large enough such that no pressure losses are generated by the openings themselves. The characteristic spring curve of the second stage therefore depends on the hydraulically effective surfaces of the pressure piston 41 in relation to the volume of the pump space 15 and the total volume of the hollow spaces 10 and 20. A highly progressive characteristic spring curve of the second stage is achieved if the slide member 42 has a section 24 which extends into the first hollow space 10 and which is slightly conical, widening toward the pump space 15 and narrowing toward the control edge 23.

Then the fluidically effective communication path between the pump space 15 and the second hollow space 20 is reduced with increasing insertion of the slide member 42 into the hollow space 10 because of the cone section 24 so that the flow cross-section is reduced with increasing piston travel. In this way, movement of the pressure piston 41 beyond the pressure equalization point between the pressure on the machine piston and the reaction pressure provided by the fluid spring can be limited or even prevented. If such a progressive excess oscillation damping is not desired the cone section should not be provided that is the slide member should be cylindrical.

The openings 21 and the communication passages are so dimensioned that, by themselves, they do not restrict the fluid flow but provide a friction-free communication path between the pump space 15 and the hollow space 10 and also, after opening of the openings 21 by the control edge 23, the second hollow space 20. As long as the connecting rod becomes shorter, oil flows from the pump space 15 through the openings 21 into the second hollow space 20 through the gap between the cone section 24 and the inner surface of the inner tube 32. The cone section is intended to prevent excessive insertion of the compression piston 41, as a result of its kinetic energy, into the tubular body 25 beyond the point at which the fluid forces are equalized by throttling of the admission of fluid to the second hollow space 20.

To prevent a rapid expansion of the oil in the hollow space 20, the check valve 19 is closed by the pressure present in the hollow space 20 pressure release from the second hollow space 20 into the pump space 15 is possible exclusively through the passages 22 through which the flow is restricted by their shape and also by the force of the compression spring 27 which acts on the check valve plate 40. In this manner, the resonance frequencies which are far above the engine rotation frequencies are dampened with the masses associated with the piston 41; the transmission of the energy stored in the fluid spring to the crankshaft occurs without restriction (energy return phase).

Figure 3:
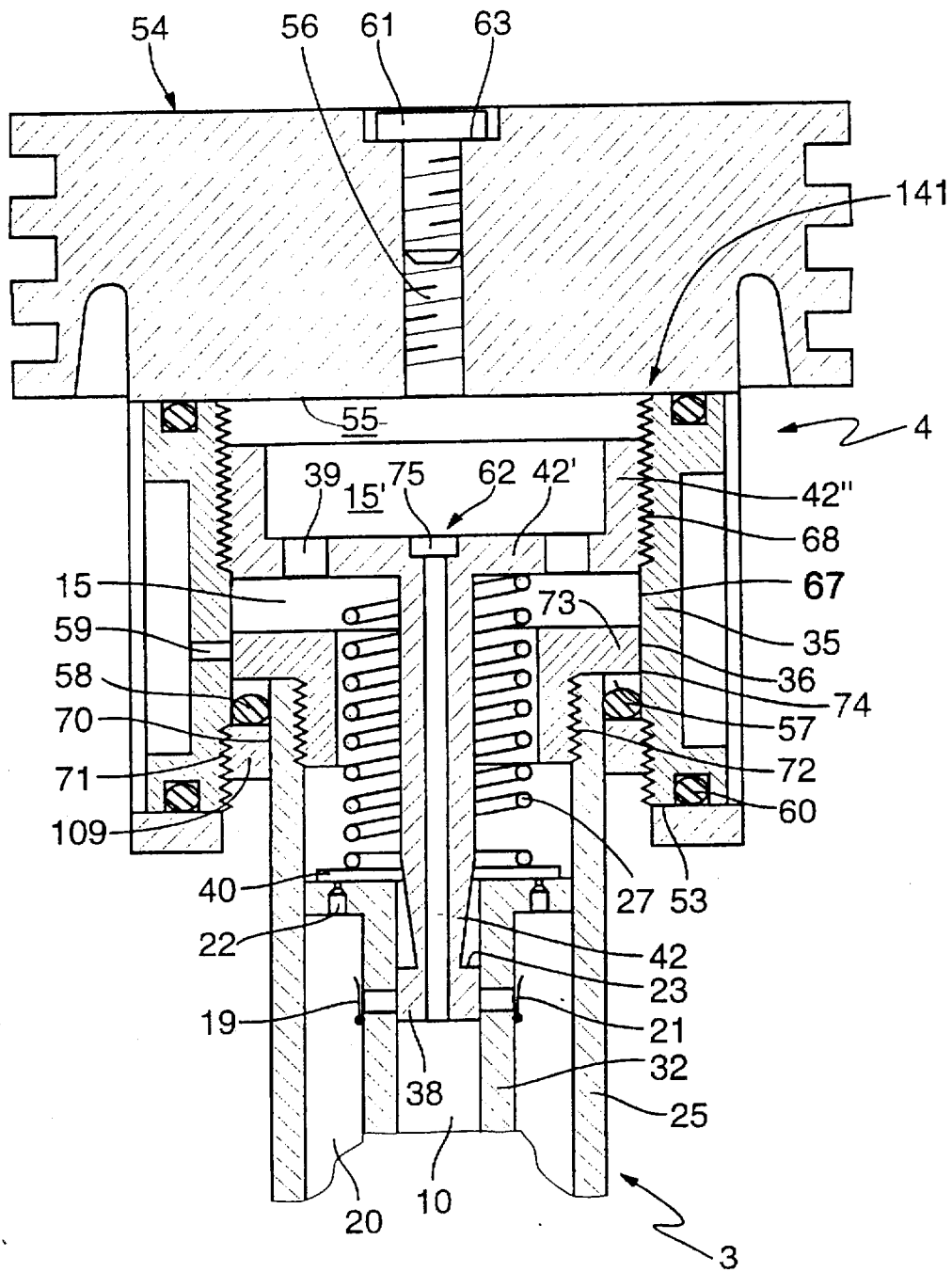
FIG. 3 is a cross-sectional view of part of the connecting rod with a two-stage fluid energy storage arrangement with a pivotally supported piston wherein the connecting rod part attached to the crank extends up to the area of the piston pivot support structure which acts as a piston pin.

FIG. 3 shows an advantageous arrangement of the piston end of the connecting rod with a two-stage fluid spring similar to that described in connection with FIG. 2.

A piston 54 is pivotally supported by a bearing 53 by means of a piston joint on a connecting rod part 4 associated with the piston. The piston joint comprises a piston pin 35 through which a cylindrical opening extends in which the end portion of the connecting rod part 3 associated with the cylinder is received. By extending the connecting rod end 3 deep into the piston, the connecting rod is relatively long for a given machine height whereby the pivot angles of the connecting rod are somewhat reduced and the friction losses of the piston 54 reciprocating in a cylinder are also reduced.

As shown in FIG. 3 an insert 23 is screwed into the end of the connecting rod portion 3 which is provided with an internal thread 72. The insert 73 has an outwardly projecting annular shoulder 74 which extends radially outwardly beyond the outer circumference of the tubular body 25. The circumferential surface of the annular shoulder 74 forms a slide fit structure 36 which guides the piston pin 35. The slide member 42 extends through the insert 73 and controls the flow communication paths as described in FIG. 2. The slide member 42 has at its upper end a radial wall 42' which separates the pump space 15 from an extended pump space 15' disposed between the radial wall 42' and the piston bottom wall 53. The pump spaces 15 and 15' are in fluid communication by way of axial openings 39 extending through a radial wall 42' and by way of a passage 42 extending axially through the slide member 42. A cylindrical portion 42" extending from the radial wall 42' is provided at its circumference with a thread 68 by which the slide member 42 is screwed into the piston pin 35 in an axially adjustable manner. Axial adjustment of the slide member 42 and consequently, a change of the spring characteristic of the fluid spring can be performed in a simple manner even when the machine is assembled by insertion of a rotating tool through a central mounting bore 56 in the piston 54 into a tool-receiving recess 75 in the opening 62 adjacent the piston 54 whereby the slide member 42 can be rotated. The mounting bore 56 is closed by a screw 61 possibly using a gasket 63.

The compression piston 141 is formed as an integral part with the piston 54 that is with the piston pin 35 and is retained in the opening in the piston pin 35 adjacent the connecting rod by a stop ring 109 which engages the annular shoulder 74. The stop ring 109 has a thread 71 by which it is threaded into the threaded end of the opening 67 of the piston pin 35. The inner surface of the stop ring 109 forms a slide fit 70 whereby the tubular body 25 is guided, the slide fit being sufficiently tight to provide a fluid seal. The annular shoulder 74 and the stop ring 109 define an intermediate space 57 in which an elastomer ring 58 is disposed which dampens the impact of the pressure piston 141 on the shoulder 74 and improves the fluid seal of the intermediate space 57.

If, as a result of a stroke of the fluid spring the oil pressure in the pump spaces 15 and 15' is increased the oil under pressure may escape by way of the slide fit structure 36 of inset 73 into the intermediate space 57 whose volume is increased at the same time. In the area of the slide fit structure 36 of the inset 73 an oil passage 59 extends through a front wall of the piston pin 35 and into the piston structure 141 which is opened by a control edge of the shoulder when the fluid spring is compressed and which then provides for communication between the increasing intermediate space 74 and the crankcase of the piston machine.

When the fluid spring returns, the oil which has been collected in the intermediate space 57 which then becomes smaller can flow back into the crankcase through the opening 59 until the opening 59 is closed. When the opening 59 is closed by the control edge of the annular shoulder 74 and the outer surface of the inset 73 the oil can escape from the intermediate space 57 only through the slide fit structure 36 back into the pump space 15' since the elastomer ring 58 prevents a flow through the slide fit structure 70 of the stop ring 109 or through the thread 71. The high oil pressure in the intermediate space 57 slows the return stroke of the fluid spring and dampens any impact of the insert 73 on the elastomer ring 58 and the stop ring 109.

The oil released through the opening 59 into the crankcase is replenished by the oil circulating system of the machine whereby, in the arrangements of FIGS. 1 and 2, the fluid piston remains filled with fluid spring oil. The piston pin 35 has, at its circumference adjacent its end faces in the area of the bearings 53, grooves in which seal rings 60 are disposed in order to prevent the axial escape of the fluid spring oil which also lubricates the piston pin.

This particularly advantageous embodiment of a connecting rod according to the invention which includes a two-stage fluid spring permits a reduction of the design height of the size and of the weight of the piston machine. Since the connecting rod part 4 adjacent the piston has a piston structure 141 which extends around the end of the tubular body 25 of the connecting rod part 3 connected to the crank, the effective pressure surface of the compression piston 141 is increased to an area corresponding to the cross-section of the opening which extends through the piston pin and is limited by the respective area of the piston bottom wall 55. The pump space 15 is expanded by an additional pump space 15' and increased up to the bottom wall 55 of the piston whereby the enclosed oil volume is further increased. Consequently, the piston forces are transmitted with relatively low oil pressure and the travel path of the fluid spring is relatively short. This results in a high resonance frequency for the whole system which is far above the critical frequency of the engine or machine in which such a connecting rod is used.

Figure 4:
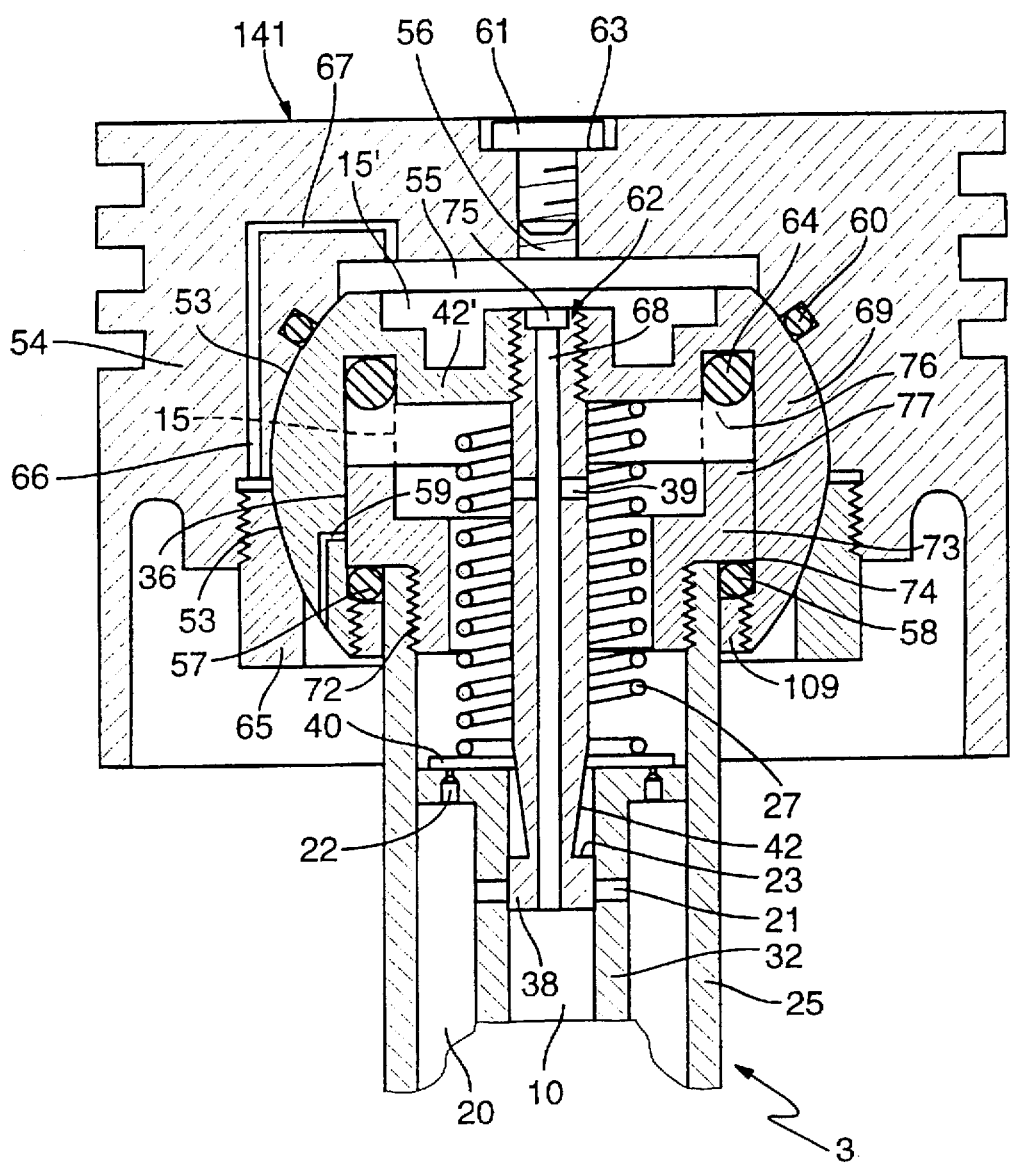
FIG. 4 is a cross-sectional view of a connecting rod similar to that of FIG. 1 wherein, however, the connecting rod to piston joint is in the form of a ball joint.

FIG. 4 is a cross-sectional view of the connecting rod end adjacent a piston with a two stage fluid spring, which is formed by a connecting rod part 3 associated with the crank and a connecting rod part 4 associated with the piston of a piston machine. The connecting rod part 4 again includes a tubular body 25 which extends into the machine piston that is into a piston joint structure 69 as it is shown for the arrangement of FIG. 3. In the arrangement of FIG. 4, however, the piston joint structure is in the form of a ball joint.

Since the connecting rod parts 3 and 4 are of a design essentially as already described earlier, equivalent parts are designated by the same reference numeral.

A piston 55 as shown in FIG. 4 is a hollow body which is open toward the connecting rod and which includes a spherically formed bearing structure 53 for the pivotal support of a spherical piston joint structure 69. The bearing structure 53 is bowl-shaped and is equatorially divided. The bearing bowl adjacent the connecting rod is disposed at the inside of a retaining ring 65 which is screwed into the piston 54 and which firmly holds the piston joint structure 69 in place within the piston 54. The piston joint structure includes an open cylindrical space into which the tubular body 25 of the connecting rod part, which is connected to the crank, extends and which encloses the pump space 15.

An insert 73 is screwed into the end portion of the tubular body 25 and is provided with an annular shoulder 74 25 which extends outwardly beyond the tubular body 25 and which is slideably supported on the circumferential surface of the wall defining the cylindrical space by means of a slide fit structure 36 whereby also the piston joint structure 69 is guided—like in FIG. 3. The pump space 15 is delineated by a radially extending wall 42' which is formed integrally with the piston joint structure 69 and which has a central threaded opening into which slide member 42 is screwed which extends through the pump space 15. The slide member 42 is essentially the same as described in connection with FIGS. 2 and 3 so that it does not need to be described again.

At its radially outer area the wall 42' includes an annular recess 76 in which an elastomer ring 64 is disposed. The insert 73 has in its radially outer area an annular projection 77 corresponding to the shape of the annular wall 42' such that the annular projection 77 can be received in the annular recess 76 when the connecting rod parts 3 and 4 are pushed into one another. If the spring travel of the fluid spring is adjusted to be excessive the movement of the compression piston 141 is dampened by the elastomer ring 64.

Between the radial wall 42' and the piston bottom wall 55 there is an expanded pump space 15' which is in fluid communication with the pump space 15 and with the hollow space 10 of the connecting rod part 3 by way of opening 62 which extends through the slide member 42 and by way of radial openings 39 in the slide member 42. The piston bottom wall 55 includes a vent opening 67 which is in communication with the equatorial separation plane of the bearing structure 53 by way of a vent passage 66. The vent passage 66 supplies lubricating oil under pressure to the bearing structure for the piston joint structure 69 from the expanded pump space 15'.

The return of the lubricating oil under pressure from the fluid spaces of the connecting rod to the lubricating circuit of the lubricating system of the piston machine is the same as described in connection with FIG. 3. In this case, oil under pressure is conducted back to the crankcase from the intermediate space 57 through an oil passage 59 in the piston joint structure 69 when opened by the ring shoulder 74 of the insert 73 to an area disposed between the retaining ring 65 and the tubular body 25 from where it can drop into the crankcase. The amount of oil passing through the connecting rod is adjustable by the throttling cross-section of the opening 67 such that also a cooling of the piston bottom wall 55 is achieved. The lubricating oil of the part of the bearing 53 adjacent the retaining ring 65 exits into the crankcase adjacent the oil passage 59. In the area of the upper ball bearing half of the piston joint structure 69 adjacent the piston, the bearing structure 53 in the piston 54 includes a groove which receives a seal ring 60.

With the ball joint-like support of the piston 55 on the connecting rod the weight of the piston machine is reduced since the ball-like piston joint structure 69 is lighter than a piston pin 35 as it is described in connection with FIG. 3. The pivot axis of the ball joint-like piston joint 69 which is defined by the largest diameter of the bearing 53 is also closer to the piston bottom wall 55 whereby the length of the connecting rod part 3 which extends from the crank can be still greater. The relatively light weight piston follows the gas pressure forces rapidly. The lengthening of the connecting rod part 3 provides for smaller pivot angles of the piston joint which results in less inclination of the connecting rod. This reduces the engagement forces of the piston with the cylinder wall such that the friction of the piston 54 in the cylinder is reduced. There are also lower inertia forces and the critical frequency of the piston-fluid spring system with respect to the rotational frequency of the crankshaft is increased.

The lengthening of the connecting rod part 3 adjacent the crank by extending the connecting rod part 3 into the piston joint of the connecting rod part 4 as shown in FIGS. 3 and 4 for a two-stage fluid spring can also be realized for a connecting rod according to the invention with a single-stage fluid spring.

Figure 5:
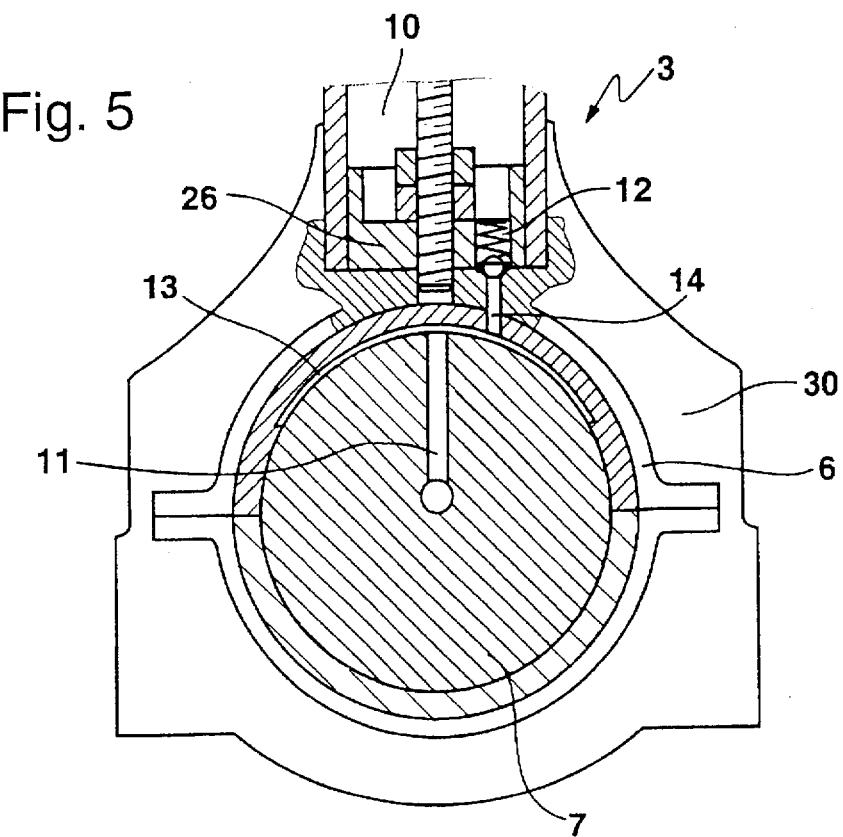
FIG. 5 is a partially sectional view of a connecting rod end bearing structure at the crankshaft for an arrangement with single stage fluid energy storage.

FIG. 5 is a partial cross-sectional view of a connecting rod part 3 adjacent the crank with a single-stage fluid spring showing an advantageous arrangement for the check valve 12, which prevents the return flow of pressurized oil from the hollow space 10. The pressurized oil is supplied to the hollow space 10 from the oil circulating system of the piston machine which is not shown in a way essentially as described in connecting with FIG. 1: The oil is supplied by way of a radial oil supply passage 11 in the crank 7 and an oil bore 14 extending through the crank bearing 6, the bearing support structure 30 and a base plate 20 delineating the hollow space 10, the oil supply passage 11 and the oil bore 14 being in fluid communication by way of a crank bearing pocket 13 formed in the axial center of the crank bearing 6. The check valve 12 is disposed in the base plate 26 between the end of the oil bore 14 and the hollow space 10.

With this arrangement of the check valve 12 in the base plate 26 at the downstream end of the oil bore 14, leakage oil losses particularly in the area of the crank bearing pocket 13 in the crank bearing 6 when high pressure conditions exist in the fluid spaces of the connecting rod are avoided.

Figure 6:
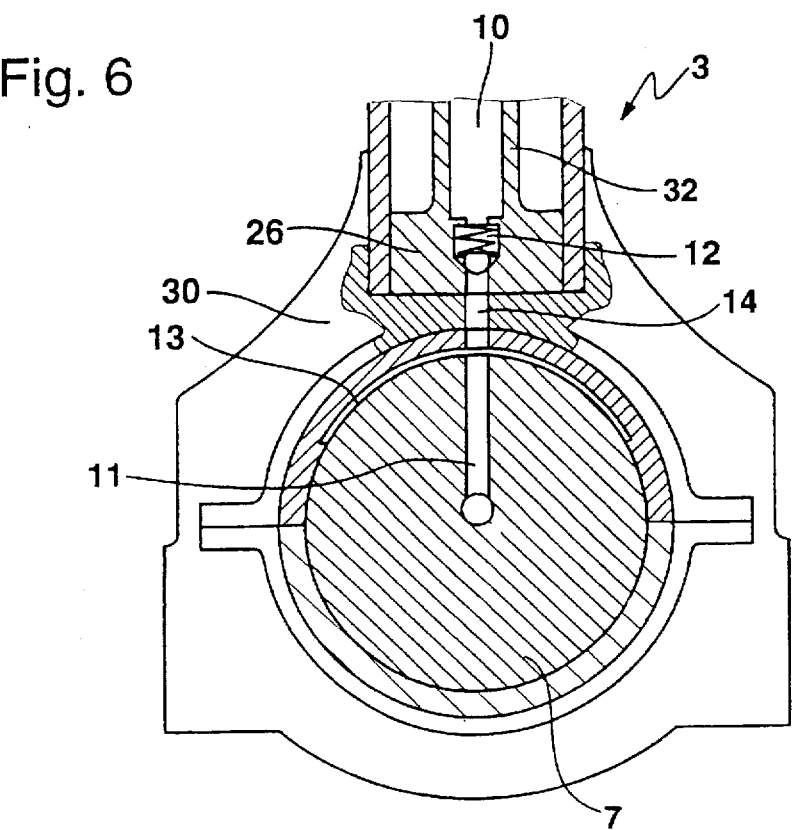
FIG. 6 is a partially sectional view of a connecting rod end bearing structure at the crankshaft for an arrangement with two-stage with two-stage fluid energy storage.

FIG. 6 shows an arrangement for the check valve 12 in a connecting rod with a two-stage fluid spring essentially as shown in FIG. 5. In this case, the oil bore 14 is arranged centrally in the base plate 26. The check valve 12 is arranged in the oil bore 14 in the area of the base plate 26 such that a return oil flow from the hollow space 10 in the inner tube 32 is prevented. Leakage oil losses in the area of the supply passages from the pressurized oil lubricating system of the piston engine to the hollow space 10 of the energy storage device of the connecting rod are consequently avoided.

What is claimed is:

1. A connecting rod for transmitting energy between a piston structure and a crankshaft of a piston machine, said connecting rod comprising two connecting rod parts which are movable relative to one another in longitudinal direction but are operatively interconnected by an energy storage device, one of said connecting rod pangs being connected to said piston structure by a piston bearing structure supported by said piston structure and the other of said connecting rod parts being a tubular body and having at its end a crank bearing support structure with a crank bearing for rotatably mounting said other connecting rod part on a crankshaft, said energy storage device being a fluid spring utilizing a fluid disposed in said connecting rod as a spring, said fluid spring includeing a delay structure effective in the operating direction of said fluid spring and comprising a disc, slidably disposed in said tubular body and defining a leakage flow passage providing for communication between said hollow space and said pump space and being calibrated so as to permit a predetermined leakage flow for limiting fluid flow from one side of said tubular body to the other.

2. A connecting rod according to claim 1, wherein said one connecting rod part includes a cylindrical bearing structure with a piston pin disposed therein.

3. A connecting rod according to claim 1, wherein said other connecting rod part which is associated with said crank has an inner wall forming a hollow space which guides the one connecting rod part which is associated with said piston and which includes a pressure piston axially movably received in said tubular body in fluid sealing relation therewith so as to define a pump space, said pressure piston being biased by a compression spring against a stop formed at the end of said other connecting rod part.

4. A connecting rod according to claim 3, wherein said pressure piston is disposed within said hollow space in a sliding fit with the inner wall of said hollow space.

5. A connecting rod according to claim 3, wherein a rod extends from said other end of said connecting rod and is disposed centrally within said hollow space, said rod having a head disposed within said pump space and said spring being supported on said head.

6. A connecting rod according to claim 1, wherein said disc has a central opening with a disc sealing surface and a rod extends through said opening and has a head with a sealing surface and a spring supported on a spring seat engages said disc so as to force its sealing surface into engagement with the sealing surface of said head for closing said central opening.

7. A connecting rod according to claim 1, wherein said connecting rod part connected to said crank is longer than said connecting rod part associated with the piston of said piston machine.

8. A connecting rod for transmitting energy between a piston bearing structure and a crankshaft of a piston machine having a pressurized oil lubricating system, said connecting rod comprising two connecting rod parts which are movable relative to one another in longitudinal direction but are operatively interconnected by an energy storage device, one of said connecting rod parts being connected to said piston bearing structure by a piston pin disposed in said piston bearing structure and the other of said connecting rod parts having at its end a crank bearing support structure with a crank bearing for rotatably mounting said other connecting rod part on said crankshaft, said energy storage device being a fluid spring formed by said connecting rod parts which are filled with oil from said oil lubricating system of said piston machine, said connecting rod parts forming a hollow space in communication with a crank bearing pocket by way of an oil bore in said crank bearing support structure and a pump space in communication with a piston pin bearing pocket by way of an oil passage in said piston pin bearing, such that oil supplied through an oil supply passage in the crankshaft is supplied from said crankshaft to said piston pin bearing through said fluid spring, and a check valve being provided in said oil bore adjacent said hollow space to prevent return flow of oil from said hollow space to said crankshaft.

9. A connecting rod according to claim 8, wherein said check valve is disposed in a base of said tubular body.

10. A connecting rod according to claim 8, wherein said piston pin bearing pocket and said crank bearing pocket are grooves extending circumferentially around part of the respective bearings symmetrically to the connecting rod and over an angle of abut 130°, said grooves having only a small axial width such that the surface area of said grooves exposed to oil pressure is smaller than the cross-section of said compression piston.

11. A connecting rod according to claim 8, wherein said other connecting rod part which is associated with said crank is a tubular body with an inner wall forming a hollow space which guides the one connecting rod part which is associated with said piston and which includes a pressure piston axially movably received within said tubular body, in fluid sealing relation therewith so as to define a pump space, said pressure piston being biased by a compression spring against a stop formed at the end of said other connecting rod part.

12. A connecting rod according to claim 11, wherein said pressure piston is disposed within said hollow space in a sliding fit with the inner wall of said hollow space.

13. A connecting rod according to claim 11, wherein a rod extends from said other end of said connecting rod and is disposed centrally within said hollow space, said rod having a head disposed within said pump space and said spring being supported on said head.

14. A connecting rod according to claim 8, wherein said disc has a central opening with a sealing surface and a rod extends through said opening and has a head with a sealing surface and a spring supported on a spring seat engages said disc so as to force its sealing surface into engagement with the sealing surface of said head for closing said central opening.

* * * * *